United States Patent
Kong

(10) Patent No.: US 8,858,219 B2
(45) Date of Patent: *Oct. 14, 2014

(54) MOLD AND METHOD FOR PRODUCING TWO-COLOR INJECTION-MOLDED PARTS

(75) Inventor: Byung Seok Kong, Gyunggi-Do (KR)

(73) Assignee: Hyundai Motor Company, Seoul (KR)

( * ) Notice: Subject to any disclaimer, the term of this patent is extended or adjusted under 35 U.S.C. 154(b) by 271 days.

This patent is subject to a terminal disclaimer.

(21) Appl. No.: 13/019,155

(22) Filed: Feb. 1, 2011

(65) Prior Publication Data

US 2011/0123658 A1    May 26, 2011

Related U.S. Application Data

(62) Division of application No. 12/358,005, filed on Jan. 22, 2009, now Pat. No. 7,897,094.

(30) Foreign Application Priority Data

Jul. 15, 2008    (KR) .................. 10-2008-0068804

(51) Int. Cl.
  *B29C 45/26*    (2006.01)
  *B29C 45/16*    (2006.01)
  *B29L 31/30*    (2006.01)

(52) U.S. Cl.
  CPC ........... *B29C 45/1635* (2013.01); *B29C 45/164* (2013.01); *B29C 45/1639* (2013.01); *B29L 2031/3005* (2013.01)
  USPC .......................................... 425/577; 425/588

(58) Field of Classification Search
  CPC ............ B29C 45/1635; B29C 45/164
  USPC ............... 425/130, 588, 577; 264/328.8
  See application file for complete search history.

(56) References Cited

U.S. PATENT DOCUMENTS

| | | | |
|---|---|---|---|
| 6,623,688 B2 | 9/2003 | Gedritis et al. | |
| 7,897,094 B2* | 3/2011 | Kong | 264/328.8 |
| 2003/0001411 A1* | 1/2003 | Gedritis et al. | 296/192 |
| 2008/0023979 A1 | 1/2008 | Trillat et al. | |
| 2009/0295011 A1* | 12/2009 | Smith et al. | 264/101 |

FOREIGN PATENT DOCUMENTS

| | | |
|---|---|---|
| CN | 1989025 A | 6/2007 |
| JP | 2000-127862 A | 5/2000 |
| KR | 97-011562 B1 | 7/1997 |
| KR | 10-2006-0025193 A | 3/2006 |
| KR | 10-2007-0053628 A | 5/2007 |

* cited by examiner

*Primary Examiner* — Robert J Grun
(74) *Attorney, Agent, or Firm* — Morgan, Lewis & Bockius LLP

(57) ABSTRACT

A mold and a method for producing two-color injection-molded parts involves simultaneous injection of two kinds of molding material, in which a pressure difference between two kinds of molding materials is induced so that one of the molding materials is infiltrated into and bonded to the other molding material during solidification. The method for producing two-color injection-molded parts may include simultaneously injecting a first material and a second material to a first gate and a second gate to be filled in a first cavity and a second cavity, and closing the second gate such that the first molding material, which is not solidified, pushes a slide mold provided between a first mold block and a second mold block using a holing pressure of the first gate and is infiltrated into an unsolidified layer of the second molding material and solidified.

4 Claims, 5 Drawing Sheets

MOLD AND METHOD FOR PRODUCING TWO-COLOR INJECTION-MOLDED PARTS

CROSS-REFERENCE TO RELATED APPLICATION

The present application is a divisional of patent application Ser. No. 12/358,005, filed on Jan. 22, 2009, which claims the benefit of and priority to Korean Patent Application Number 10-2008-0068804 filed Jul. 15, 2008, the entire contents of which application is incorporated herein for all purposes by this reference.

BACKGROUND OF THE INVENTION

1. Field of the Invention

The present invention relates to a mold and a method for producing two-color injection-molded parts. More particularly, the present invention relates to a mold and a method for producing two-color injection-molded parts, in which a pressure difference between two kinds of molding materials, which are simultaneously injected, is induced so that one of the molding materials is infiltrated into and bonded to the other molding material during solidification.

2. Description of Related Art

It is well known that an injection molding process is used to manufacture plastic parts in the field of automotive industry. In general, the injection molding process uses plastic materials that have a single color to manufacture plastic parts having the corresponding color.

A component of a vehicle such as a door panel, for example, is generally formed of a plastic material having a single color, which does not make a good impression on users. As an alternative plan, a door panel assembly is manufactured by assembling a plurality of parts having at least one color.

However, such a method has problems in that the process of assembling the plurality of parts which constitute the door panel assembly is time consuming, and thus increases the manufacturing cost. In order to solve such problems, conventionally, molding materials having different colors are used to produce two-color injection-molded parts.

FIG. 1 is a diagram schematically showing a conventional process for producing two-color injection-molded parts.

As shown in FIG. 1, the conventional method for producing two-color injection-molded parts uses a mold including two cavities in which molding materials having different colors are filled. After a first molding material is firstly injected into a first cavity 1, a second mold block 4 is moved back to open a second cavity 2, and then a second molding material is secondly injected into the second cavity 2. A holding pressure is maintained until the injected molding materials are solidified and a cooling step is performed such that the firstly injected molding material and the secondly injected molding material are bonded to each other, thus obtaining the two-color injection-molded part.

However, the above-described conventional method for producing two-color injection-molded parts has problems in that, since the cycle time is increased since the process of moving back the second mold block 4 and the first and second injection processes are performed step by step with a time difference, the manufacturing time and cost are increased.

Moreover, since the second injection process is performed after the firstly injected molding material is solidified, the adhesion strength between the first and second molding materials is reduced.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

The present invention has been made in an effort to solve the above-described problems associated with prior art. Accordingly, various aspects of the present invention provide for a mold and a method for producing two-color injection-molded parts, in which different molding materials are simultaneously injected to reduce injection time and a pressure difference between the molding materials is induced so that one of the molding materials is infiltrated into and bonded to an unsolidified portion of the other molding material during solidification.

One aspect of the present invention is directed to a mold for producing two-color injection-molded parts, the mold including a first mold block and a second mold block, which may be arranged side-by-side, a die including a first cavity and a second cavity disposed between the die and the first and second mold blocks, respectively, a slide mold provided between the first and second mold blocks and being configured to contract when a pressure within at least one of the first and second cavities rises above a predetermined level, and/or a first gate and a second gate provided in the first cavity and the second cavity to guide a first molding material and a second molding material simultaneously injected from an injector to the first cavity and the second cavity, respectively.

The slide mold may include a reciprocator biasing an upper block away from a lower block towards the first and second cavities.

The slide mold may be configured to interconnect the first cavity and the second cavity when the pressure rises above the predetermined level and moves the upper block towards the lower block A first distance between the first gate and the slide mold may be less than a second distance between the second gate and the slide mold.

The slide mold may include a reciprocator biasing an upper block away from a lower block towards the first and second cavities.

The slide mold may be configured to interconnect the first cavity and the second cavity when the pressure rises above the predetermined level and moves the upper block towards the lower block.

Another aspect of the present invention is directed to a method for producing two-color injection-molded parts, the method including simultaneously injecting a first material and a second material into a die through a first gate and a second gate, respectively, to fill a first cavity and a second cavity respectively defined by the die and a first mold block and a second mold block, closing the second gate, and/or pressurizing the first gate such that the first molding material, while unsolidified, pushes a slide mold provided between the first and second mold blocks thereby allowing the first molding material to infiltrated into an unsolidified layer of the second molding material.

The slide mold may include a reciprocator biasing an upper block away from a lower block towards the first and second cavities.

The slide mold may be configured to interconnect the first cavity and the second cavity when the pressure rises above the predetermined level and moves the upper block towards the lower block, the method may include bonding the first molding material may be to the second molding material.

A first distance between the first gate and the slide mold may be less than a second distance between the second gate and the slide mold.

The slide mold may include a reciprocator biasing an upper block away from a lower block towards the first and second cavities.

The slide mold may be configured to interconnect the first cavity and the second cavity when the pressure rises above the predetermined level and moves the upper block towards the lower block, the method may include bonding the first molding material may be to the second molding material.

The method may include forming an vehicle component including the first and second materials. The forming step may include forming a vehicle door panel including the first and second materials.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
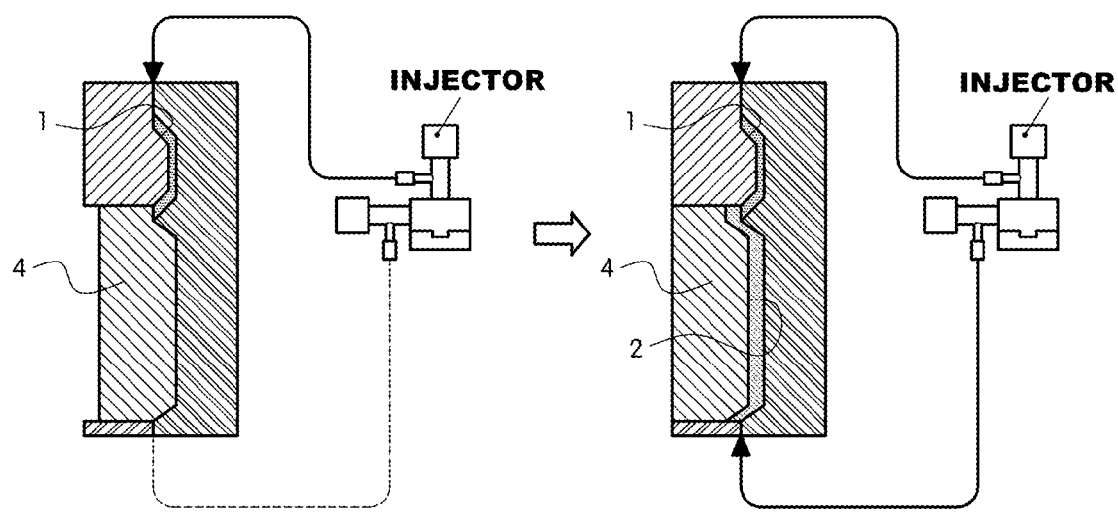
FIG. 1 is a diagram schematically showing a conventional process for producing two-color injection-molded parts.
Figure 2:
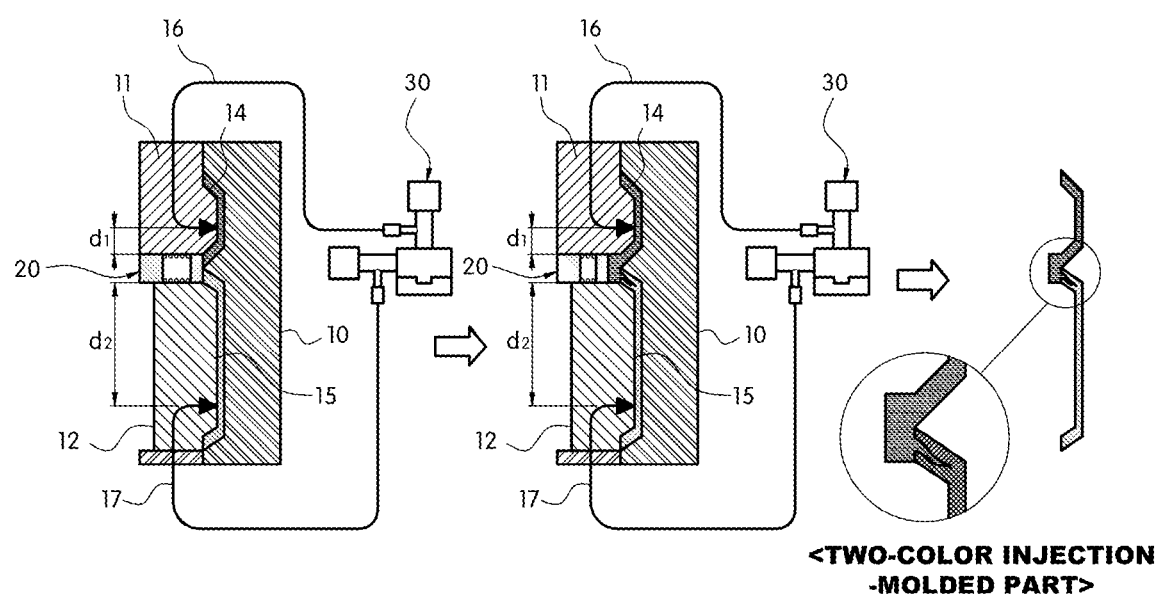
FIG. 2 is a diagram schematically showing an exemplary molding process using a mold for producing two-color injection-molded parts in accordance with the present invention.
Figure 3A:
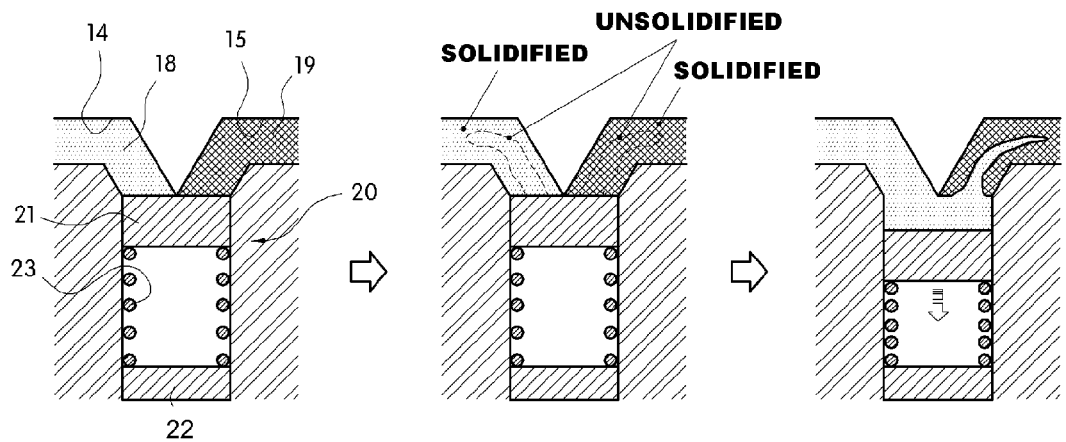
FIG. 3A is a diagram showing the operation of an exemplary main part in accordance with the present invention.
Figure 3B:
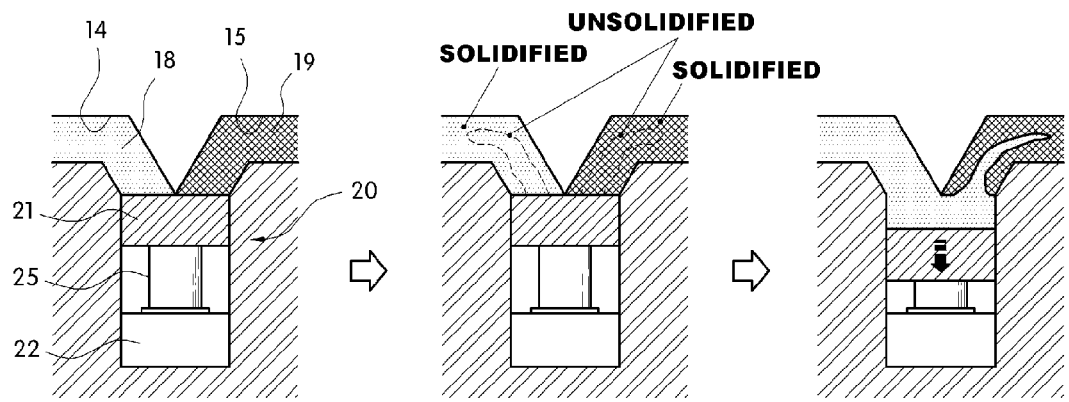
FIGS. 3B and 3C are diagrams showing the operation of another exemplary main part in accordance with the present invention.
Figure 3C:
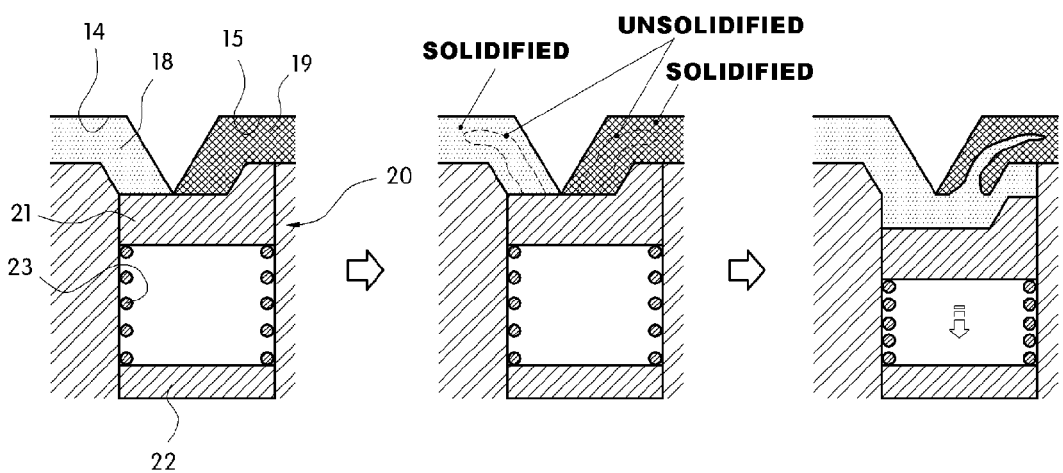
Figure 4:
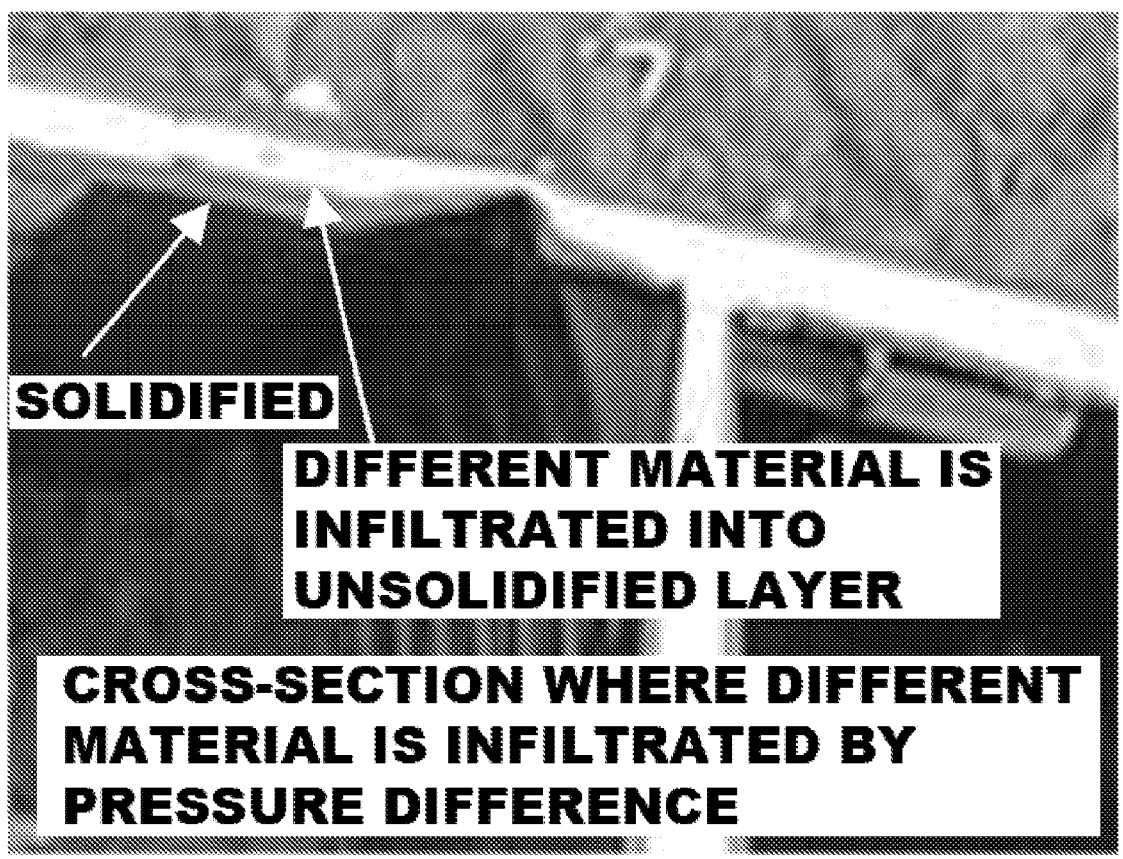
FIG. 4 is an image showing a cross-section of an exemplary two-color injection molded part formed of different molding materials in which one of the different molding materials is infiltrated into and bonded to the other molding materials by a pressure difference occurring therebetween.
Figure 5:
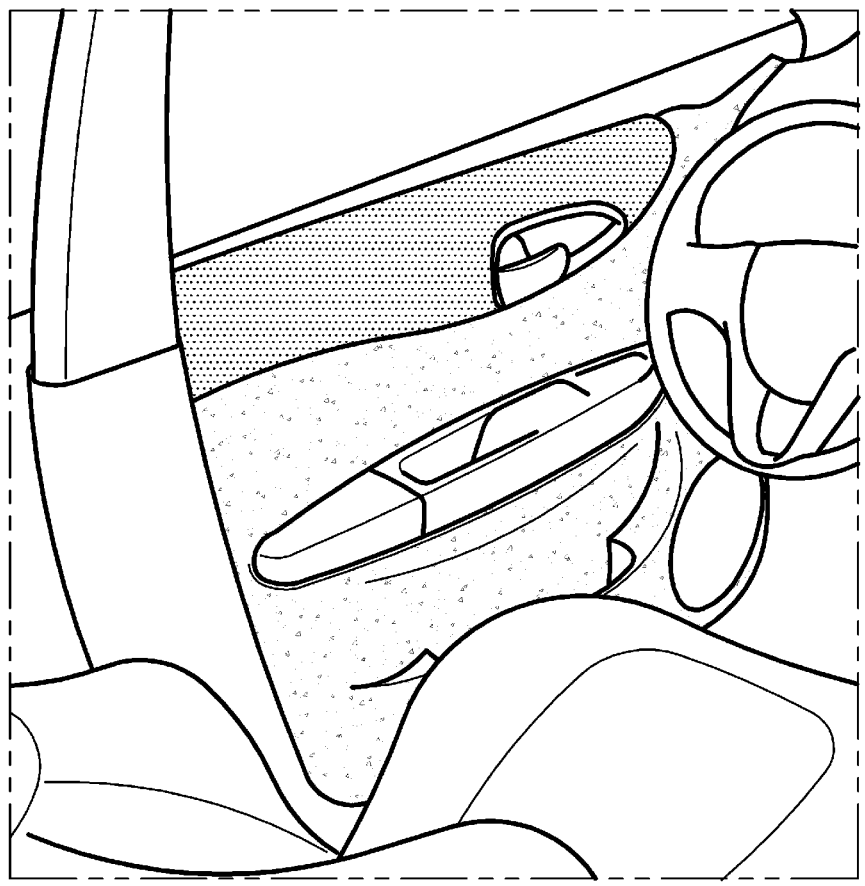
FIG. 5 is a diagram showing an exemplary vehicle portion produced by a method for producing two-color injection-molded parts in accordance with the present invention.

FIG. 2 is a diagram schematically showing a molding process using a mold for producing two-color injection-molded parts in accordance with the present invention, FIG. 3A is a diagram showing the operation of a main part in accordance with various embodiments of the present invention, FIGS. 3B and 3C are diagrams showing the operation of a main part in accordance with other embodiments of the present invention, and FIG. 4 is an image showing a cross-section of a two-color injection molded part formed of different molding materials in which one of the different molding materials is infiltrated into and bonded to the other molding materials by a pressure difference occurring therebetween.

The method for producing two-color injection-molded parts in accordance with the present invention produces the two-color injection-molded parts by maintaining a holding pressure only in a first molding material 18 such that the first molding material 18 is infiltrated into an unsolidified central core portion of a second molding material 19.

For this purpose, as shown in FIG. 2, the mold for producing two-color injection-molded parts in accordance with the present invention includes a die 10 disposed opposite to first and second mold blocks 11 and 12 arranged side by side thus defining first and second cavities 14 and 15, in which molding materials are filled, disposed between the die 10 and the first and second mold blocks 11 and 12. Moreover, a slide mold 20, which is moved by pressure, is provided between the first and second mold blocks 11 and 12, and first and second gates 16 and 17, which guide the first and second molding materials 18 and 19 injected by an injector 30 to the first and second cavities 14 and 15, respectively.

At this time, the first and second molding materials 18 and 19 injected from the injector 30, respectively, are formed of different resins. The slide mold 20 has a structure in which a reciprocator such as a spring 23 is disposed between an upper block 21 and a lower block 22 so as to be contracted and moved when a pressure above a predetermined level (an elastic force of the spring) is applied as shown in FIG. 3A. For example, as pressure within one or both cavities rises above a predetermined level (e.g., n psi), the pressure overcomes the biasing force of spring 23 to move upper block 21 towards lower block 22 and to a contracted position leaving slide mold in a contracted state.

Moreover, the distance between the first gate 16 and the slide mold 20 is set to be smaller than that between the second gate 17 and slide mold 20 so that the second molding material 19 filled in the second cavity 15 is solidified more slowly than the first molding material 18 filled in the first cavity 14.

Meanwhile, as shown in FIG. 3C, the slide mold 20 may have a structure in which the upper block 21 is formed to extend toward the second cavity 15 so as to increase the bonding area between the first and second molding materials 18 and 19. Otherwise, as shown in FIG. 3B, the spring 23 may be replaced with a hydraulic cylinder 25. In addition to, or instead of springs and hydraulic cylinders, one will appreciate that other suitable reciprocating means may be utilized to bias the upper block away from the lower block and towards the first and second cylinders.

In the case where the slide mold 20 is configured by replacing the spring 23 with the hydraulic cylinder 25, the slide mold 20 is contracted and moved by the operation of the hydraulic cylinder 25, and thereby the slide mold 20 can be moved regardless of the magnitude of the holding pressure in the first gate 16 or moved forcibly.

Next, the method for producing two-color injection-molded parts using the above-described mold in accordance with the present invention will be described.

According to the present invention, the first and second molding materials 18 and 19 are simultaneously injected from the injector 30 and simultaneously filled in the first and second cavities 14 and 15 through the first and second gates 16 and 17.

When the molding materials are filled in the above manner, a holding pressure is maintained until the molding materials do not flow backward as the gates are solidified so that the molding materials flow backward and the contraction amount is supplemented. At this time, the first gate 16 is kept open so as to maintain a constant pressure until the molding material is solidified, and the second gate 17 is closed to cut off the holding pressure.

As shown in FIGS. 3A and 3B, the molding materials 18 and 19 filled in the first and second cavities 14 and 15 are solidified from the outside which is in contact with the wall surface of the mold toward the inside gradually. The first molding material 18 pushes the upper block 21 of the slide mold 20 due to the holding pressure of the first gate 16 and is filled in an empty space.

The first molding material 18, which is not unsolidified, is infiltrated into an unsolidified portion (or unsolidified layer) of the second molding material 19 by a pressure difference due to the holding pressure and bonded to the second molding material 19 and solidified.

Moreover, a difference between the distances from the first and second gates 16 and 17 to the slide mold 20 is set to be relatively large (d1<<d2), and thereby the solidification rate of the second molding material 19 is lower than that of the first molding material 18 such that the first molding material 18 is infiltrated into the unsolidified layer of the second molding material 19.

The first molding material 18 infiltrated into the unsolidified layer of the second molding material 19 is solidified and subjected to a cooling process, thus obtaining the two-color injection-molded part.

Meanwhile, as shown in FIG. 3C, in the case where the upper block 21 of the slide mold 20 is formed to extend, the area where the first molding material 18 is bonded to the second material 19 is increased, and thereby the bonding strength is increased.

In other words, according to the present invention, since the first and second molding materials 18 and 19 are simultaneously injected from the injector 30 and simultaneously filled in the first and second cavities 14 and 15, the injection time is reduced to approximately 30% compared with the conventional method. Moreover, since one of the molding materials is infiltrated into the other molding material, the materials are bonded to each other during solidification, and thereby the bonding strength is increased.

As described above, the present invention may have the following effects.

Since one of the different molding materials is infiltrated into the other molding material and solidified during the injection molding process, the bonding strength is increased. Moreover, since the different molding materials are simultaneously injected and filled, the injection time is reduced.

Furthermore, the manufacturing time is reduced due to the reduction in the injection time, and thereby the manufacturing cost is reduced.

For convenience in explanation and accurate definition in the appended claims, the terms "upper" or "lower", "inside", and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A mold for producing two-color injection-molded parts, the mold comprising:
   a first mold block and a second mold block, which are arranged side-by-side;
   a die including a first cavity and a second cavity disposed between the die and the first and second mold blocks, respectively;
   a slide mold provided in a space formed between the first and second mold blocks and being configured to retract into the space when a pressure within at least one of the first and second cavities rises above a predetermined level; and
   a first gate and a second gate provided in the first cavity and the second cavity to guide a first molding material and a second molding material simultaneously injected from an injector to the first cavity and the second cavity, respectively,
   wherein the slide mold includes a reciprocator biasing an upper block away from a lower block towards the first and second cavities when the first molding material and the second molding material are injected from the injector to a bottom surface of the upper block through the first cavity and the second cavity.

2. The mold of claim 1, wherein the slide mold is configured to interconnect the first cavity and the second cavity when said pressure rises above said predetermined level and moves the upper block towards the lower block.

3. The mold of claim 1, wherein a first distance between the first gate and the slide mold is less than a second distance between the second gate and the slide mold.

4. The mold of claim 1, wherein:
   the lower block is fixed in the space; and
   the upper block is slidable in the space and is elastically biased away from the lower block toward the first cavity and the second cavity, the upper block retracting into the space when the pressure within the at least one of the first and second cavities rises above the predetermined level to allow fluid-communication between the first cavity and the second cavity.

* * * * *